(12) United States Patent
Linzer (10) Patent No.: US 8,675,086 B1
(45) Date of Patent: Mar. 18, 2014

(54) ARCHITECTURE FOR VIDEO, FAST STILL AND HIGH QUALITY STILL PICTURE PROCESSING

(75) Inventor: Elliot N. Linzer, Suffern, NY (US)

(73) Assignee: Ambarella, Inc., Santa, Clara, CA (US)

( * ) Notice: Subject to any disclaimer, the term of this patent is extended or adjusted under 35 U.S.C. 154(b) by 368 days.

(21) Appl. No.: 12/732,614

(22) Filed: Mar. 26, 2010

(51) Int. Cl.
*H04N 5/225* (2006.01)
*H04N 5/217* (2011.01)

(52) U.S. Cl.
USPC ........................................ 348/220.1; 348/241

(58) Field of Classification Search
USPC ........... 348/220.1, 231.9, 231.2, 241, 333.01, 348/333.05, 333.11, 333.12, 222.1, 231.99; 382/265, 293, 300, 302
See application file for complete search history.

(56) References Cited

U.S. PATENT DOCUMENTS

| | | | | |
|---|---|---|---|---|
| 5,153,730 | A * | 10/1992 | Nagasaki et al. | 348/231.6 |
| 5,402,179 | A * | 3/1995 | Okada | 348/607 |
| 5,488,374 | A * | 1/1996 | Frankot et al. | 342/25 C |
| 5,734,425 | A * | 3/1998 | Takizawa et al. | 348/231.9 |
| 7,139,020 | B2 * | 11/2006 | Tamashima | 348/231.3 |
| 7,433,544 | B2 * | 10/2008 | Lin et al. | 382/299 |
| 7,477,301 | B2 * | 1/2009 | Ikeda | 348/241 |
| 7,536,487 | B1 | 5/2009 | Kohn | 345/503 |
| 7,787,026 | B1 * | 8/2010 | Flory et al. | 348/231.99 |
| 2002/0041761 | A1 * | 4/2002 | Glotzbach et al. | 396/429 |
| 2003/0112340 | A1 * | 6/2003 | Okada et al. | 348/220.1 |
| 2003/0117513 | A1 * | 6/2003 | Anderson | 348/333.11 |
| 2003/0122952 | A1 * | 7/2003 | Kuroiwa | 348/333.11 |
| 2003/0160874 | A1 * | 8/2003 | Kuroiwa | 348/220.1 |
| 2004/0212692 | A1 * | 10/2004 | Nakami et al. | 348/224.1 |
| 2005/0122408 | A1 * | 6/2005 | Park et al. | 348/223.1 |
| 2006/0285761 | A1 * | 12/2006 | Kasperkiewicz et al. | 382/254 |
| 2007/0153093 | A1 * | 7/2007 | Lin et al. | 348/222.1 |
| 2007/0159642 | A1 * | 7/2007 | Choi | 358/1.2 |
| 2007/0273771 | A1 * | 11/2007 | Hayashi | 348/222.1 |
| 2008/0111821 | A1 * | 5/2008 | Arora | 345/520 |
| 2008/0291330 | A1 * | 11/2008 | Vakrat et al. | 348/607 |

* cited by examiner

*Primary Examiner* — Aung S Moe
*Assistant Examiner* — Chriss Yoder, III
(74) *Attorney, Agent, or Firm* — Christopher P. Maiorana, PC (57) ABSTRACT

An apparatus having a first circuit is disclosed. The first circuit may (i) receive an input signal from an electro-optical sensor and (ii) generate a compressed signal. The first circuit generally includes re-sampler circuits configured to process the input signal to generate output samples. Each output sample may be a linear combination of at least two input samples. Video processing may include at least two tasks among (a) generating a video signal by converting the input signal for an external video monitor, (b) generating a video signal by converting the input signal for a preview screen and (c) generating a video signal by resolution reduction of the input signal before compression. At least two re-sampler circuits may perform different tasks. Still processing generally includes a noise reduction of an input image of the input signal using at least one of the at least two re-sampler circuits.

26 Claims, 6 Drawing Sheets

ARCHITECTURE FOR VIDEO, FAST STILL AND HIGH QUALITY STILL PICTURE PROCESSING

CROSS REFERENCE TO RELATED APPLICATIONS

The present application is related to co-pending U.S. application Ser. No. 12/731,372 filed Mar. 25, 2010, and U.S. Pat. No. 7,536,487, which are hereby incorporated by reference in their entirety.

FIELD OF THE INVENTION

The present invention relates to a method and/or architecture for digital cameras generally and, more particularly, to an architecture for video, fast still and high quality still picture processing.

BACKGROUND OF THE INVENTION

Hybrid still/video cameras can be used to record both video and still pictures. Due to the demands for low cost, low power devices that can both (i) capture video at high resolutions and frame rates and (ii) capture still pictures at high speeds, the use of dedicated processing hardware is an attractive option for camera makers as dedicated hardware is commonly cheaper and more power efficient than general purpose processors.

Some processing criteria for video and still pictures are identical, for example demosaic processing. However, other processing criteria for still pictures and video differ. For example, video is captured "live" and so having multiple dedicated hardware circuits to generate multiple resolutions of each frame/field can be helpful. The multiple resolutions of the same frame/field could be used for all or some of: (i) generating a preview picture presented to a television monitor, (ii) generating a preview picture shown on a built-in display on the camera and (iii) generating a reduced resolution stream for dual stream recording (i.e., recoding at 1920× 1080 pixels and 640×480 pixels; the latter being used for easy sharing over the Internet). In contrast, still picture processing typically includes a single preview picture at the resolution of the built-in display.

The temporal nature of video compared with the static nature of still pictures also results in different processing. In particular, video processing for good low light performance can include Motion Compensated Temporal Filtering (MCTF). In contrast, conventional still picture processing does not involve temporal filtering and thus no motion compensation between pictures. Because still cameras do not use MCTF, powerful still picture noise reduction is often implemented, especially when taking high ISO speed pictures. Because of the real time nature of video, such processing, even on dedicated hardware, can be too expensive to be practical. Moreover, still cameras have criteria that are difficult to meet simultaneously. For example, high speed capture and high quality powerful noise reduction.

SUMMARY OF THE INVENTION

The present invention concerns an apparatus generally having a first circuit. The first circuit may be configured to (i) receive an input signal from an electro-optical sensor and (ii) generate a compressed signal based on the input signal. The first circuit generally includes a plurality of re-sampler circuits configured to process the input signal to generate a corresponding plurality of output samples. Each of the output samples may be a linear combination of a corresponding at least two input samples. A video type of the processing may include at least two tasks among (a) generating a first video signal by converting the input signal into a first form suitable to display on an external video monitor, (b) generating a second video signal by converting the input signal into a second form suitable to display on a preview screen and (c) generating a third video signal by reducing a resolution of the input signal prior to compression. At least two of the re-sampler circuits may perform different ones of the tasks. A still type of the processing generally includes a noise reduction of an input image of the input signal using at least one of the at least two re-sampler circuits involved in the tasks.

The objects, features and advantages of the present invention include providing an architecture for video, fast still and high quality still picture processing that may (i) perform multiple passes through circuitry, (ii) perform single passes through the circuitry, (iii) dynamically configure the circuitry to process video, (iv) dynamically configure the circuitry to process still pictures, (v) provide high speed capture of pictures, (vi) provide high quality noise reduction and/or (vii) operate with less power than conventional architectures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Processing a sequence of images in video may be achieved using multiple re-sampler circuits configured to perform different tasks. For example, in each frame/field time a single re-sampler circuit may generate a monitor (e.g., television) picture, another re-sampler circuit may generate a picture for the on-camera display and yet another re-sampler circuit may generate a reduced resolution sequence that may be compressed and then stored. For still picture processing, some or all of the functions may not be utilized. For example when processing video, each of two or more re-sampler circuits is generally dedicated to a different task (e.g., TV monitor, LCD preview, or low-resolution video) while for still processing at least one of the re-sampler circuits may be used for noise reduction.

Figure 1:
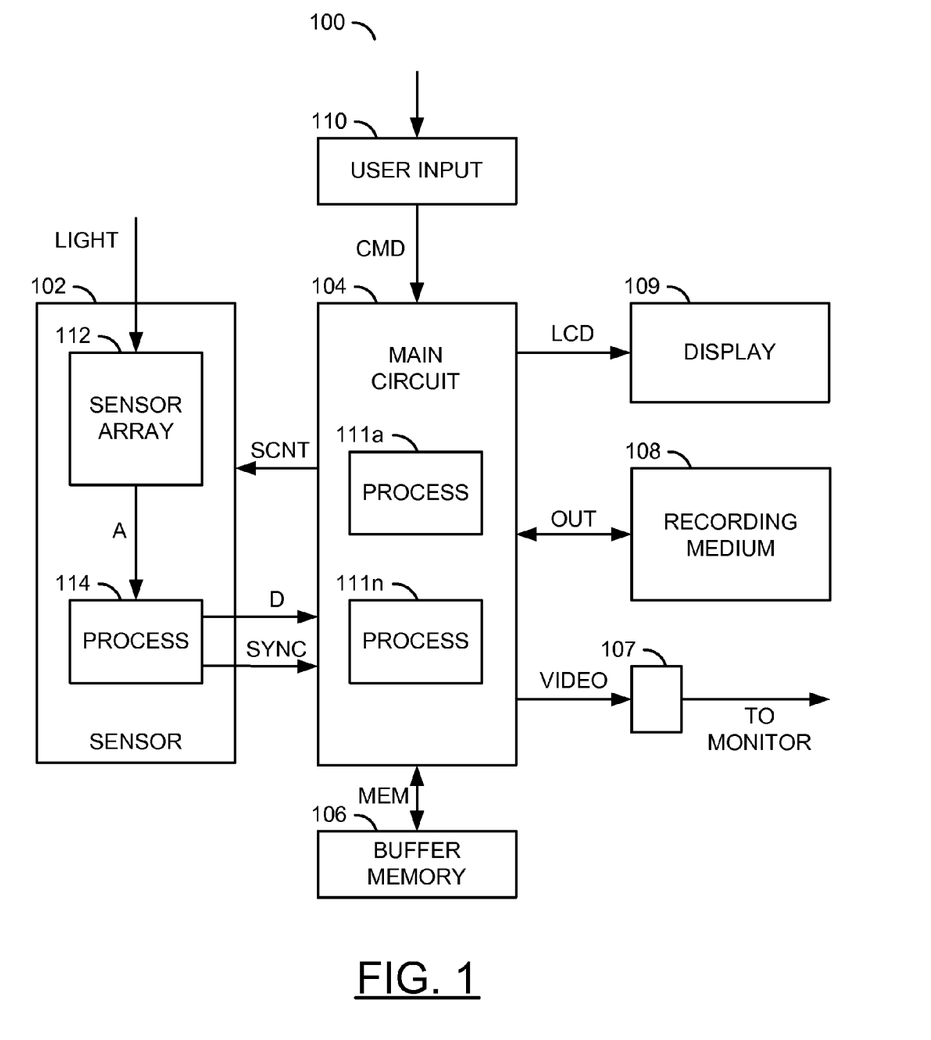
FIG. 1 is a block diagram of an example implementation of an apparatus in accordance with a preferred embodiment of the present invention.

Referring to FIG. 1, a block diagram of an example implementation of an apparatus 100 is shown in accordance with a preferred embodiment of the present invention. The apparatus (or system) 100 may form a digital still camera and/or camcorder. The apparatus 100 generally comprises a circuit (or module) 102, a circuit (or module) 104, a circuit (or module) 106, a circuit (or port) 107, a circuit (or module) 108, a circuit (or module) 109 and a circuit (or module) 110. An optical signal (e.g., LIGHT) may be received by the circuit 102. The circuit 102 may generate and present a digital signal (e.g., D) to the circuit 104. A synchronization signal (e.g., SYNC) may also be generated by the circuit 102 and received by the circuit 104. A sensor control signal (e.g., SCNT) may be generated and presented from the circuit 104 to the circuit 102. A signal (e.g., OUT) may be exchanged between the circuit 104 and the circuit 108. The circuit 104 may generate and present a signal (e.g., VIDEO) through the interface 107 to a monitor outside the apparatus 100. A signal (e.g., LCD) may be generated by the circuit 104 and presented to the circuit 109. A command signal (e.g., CMD) may be generated by the circuit 110 and presented to the circuit 104. A signal (e.g., MEM) may be exchanged between the circuit 104 and the circuit 106. The circuits 102 to 110 may be implemented in hardware, software, firmware or any combination thereof.

The circuit 102 may implement an electro-optical sensor circuit. The circuit 102 is generally operational to convert the optical image received in the signal LIGHT into the signal D based on parameters received in the signal SCNT. The signal D may convey the one or more optical images as one or more digital images (e.g., fields, frames, pictures). The signal SYNC generally conveys synchronization information related to the images and the pixels within. The signal SCNT may carry windowing, binning, read rate, offset, scaling, color correction and other configuration information for use by the circuit 102. The images may be generated having an initial resolution and an initial color space (e.g., a Bayer color space in which each pixel may be represented by multiple color samples) at an initial data rate. In some embodiments, the circuit 102 may include an image pipeline or other image source that supplies source images in the signal D.

The circuit 104 may implement a main circuit. The circuit 104 is generally operational to generate the signals OUT, VIDEO and LCD by processing the images received in the signal D. The circuit 104 may be operational to generate the signal SCNT based on the user selections received through the signal CMD. The circuit 104 may load and store data to the circuit 106 through the signal MEM. The signal OUT generally comprises a still image (e.g., JPEG) and/or a sequence of images (or pictures). The signal VIDEO generally comprises a video signal (e.g., ITU-R BT.601, ITU-R BT.709, ITU-R BT.656-4, H.264/AVC, MPEG-2 or MPEG-4). Other standard and/or proprietary still picture and/or video compression standards may be implemented to meet the criteria of a particular application.

The circuit 104 generally comprises two or more circuits (or modules) 111a-111n. Each of the circuits 111a-111n may be configured to perform one or more operations on the images to achieve final images in the signals OUT, VIDEO and LCD. In some embodiments, some to all of the circuits 111a-111n may implement re-sampler circuits. Each circuit 111a-111n may generate a corresponding output image by processing a corresponding input image. Some or all of the output samples (e.g., components of the output pixel in the output image) may be a linear combination of two or more input samples (e.g., components of the input pixels in the corresponding input image). Processing of the images may include, but is not limited to, decimation filtering, interpolation, formatting, color space conversions, color corrections, tone corrections, gain corrections, offset corrections, black level calibrations, white balancing, image sharpening, image smoothing, up conversions, down conversions, filtering and the like. In various embodiments, the processing may be implemented in whole or in part by software running in the circuits 111a-111n. In some embodiments, the circuit 102 and the circuit 104 may be fabricated in (on) separate dies. In other embodiments, the circuit 102 and the circuit 104 may be fabricated in (on) the same die. Additional details of the circuit 104 may be found in U.S. Pat. No. 7,536,487, hereby incorporated by reference in its entirety.

The circuit 106 may implement a buffer memory. The circuit 106 is generally operational to store image data temporarily (e.g., luminance and chrominance) for the circuit 104. In some embodiments, the circuit 106 may be fabricated as one or more dies separate from the circuit 104 fabrication. In other embodiments, the circuit 106 may be fabricated in (on) the same die as the circuit 104. The circuit 106 may implement a double data rate (DDR) synchronous dynamic random access memory (SDRAM). Other memory technologies may be implemented to meet the criteria of a particular application.

The circuit 107 may implement a connector. The circuit 107 is generally configured to allow the apparatus 100 to be connected to a television or computer monitor. Formats for the circuit 107 may include, but are not limited to, a component interface, s-video interface, a High-Definition Multimedia Interface (HDMI) interface and the like.

The circuit 108 may implement a medium. The medium 108 generally comprises one or more nonvolatile memory devices capable of storing the signal OUT. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive). In some embodiments, the recording medium 108 may be implemented as multiple media. For example, (i) a FLASH memory may be implemented and (ii) a tape medium or an optical medium may be implemented for recording the signal OUT. Other types of media may be implemented to meet the criteria of a particular application.

The circuit 109 may implement a local display of the camera/camcorder. The circuit 109 may be operational to display the still images and/or video received through the signal LCD. The still images/video may be lower-resolution versions of the images in the signal D. In some embodiments, the circuit 109 may implement a color or black-and-white liquid crystal display. Other display technologies may be implemented to meet the criteria of a particular application.

The circuit 110 may implement a user input circuit. The circuit 110 may be operational to generate the signal CMD based on commands received from a user. The commands received may include, but are not limited to, a take still picture command, a start recording command, a stop recording command, a zoom in command and a zoom out command. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The circuit 102 generally comprises a sensor array 112 and a circuit (or module) 114. The array 112 may be operational to convert the optical images into a series of values in an analog signal (e.g., A). The values conveyed in the signal A may be analog voltages representing an intensity value at a predetermined color for each individual sensor element of the circuit 112. The circuit 112 may include an electronic cropping (or windowing) capability. The electronic cropping capability may be operational to limit readout of image elements in a window (or an active area) of the circuit 112. The circuit 114 may be operational to process and then convert the analog signal A to generate the digital signal D. The circuits 112 and 114 may be implemented in hardware, software, firmware or any combination thereof.

Processing of the electronic images in the circuit 114 may include, but is not limited to, analog gain for color corrections and analog offset adjustments for black level calibrations. The conversion generally comprises an analog to digital conversion (e.g., 10-bit). An example implementation of the circuit 102 may be an MT9T001 3-megapixel digital image sensor available from Micron Technology, Inc., Boise, Idaho. Larger or smaller circuits 102 may be implemented to meet the criteria of a particular application.

In some embodiments, images received by the circuit 104 from the circuit 102 may pass through the circuits 111a-111n configured for still picture processing only once (e.g., 1-pass still processing). Likewise, images may pass through the circuits 111a-111n configured for video processing only once (e.g., 1-pass video processing). In general, the re-sampler circuits may be allocated differently while processing a still picture and while processing a video picture. In other embodiments, the images may pass through one or more of the circuits 111a-111n multiple times (e.g., multi-pass processing).

Figure 2:
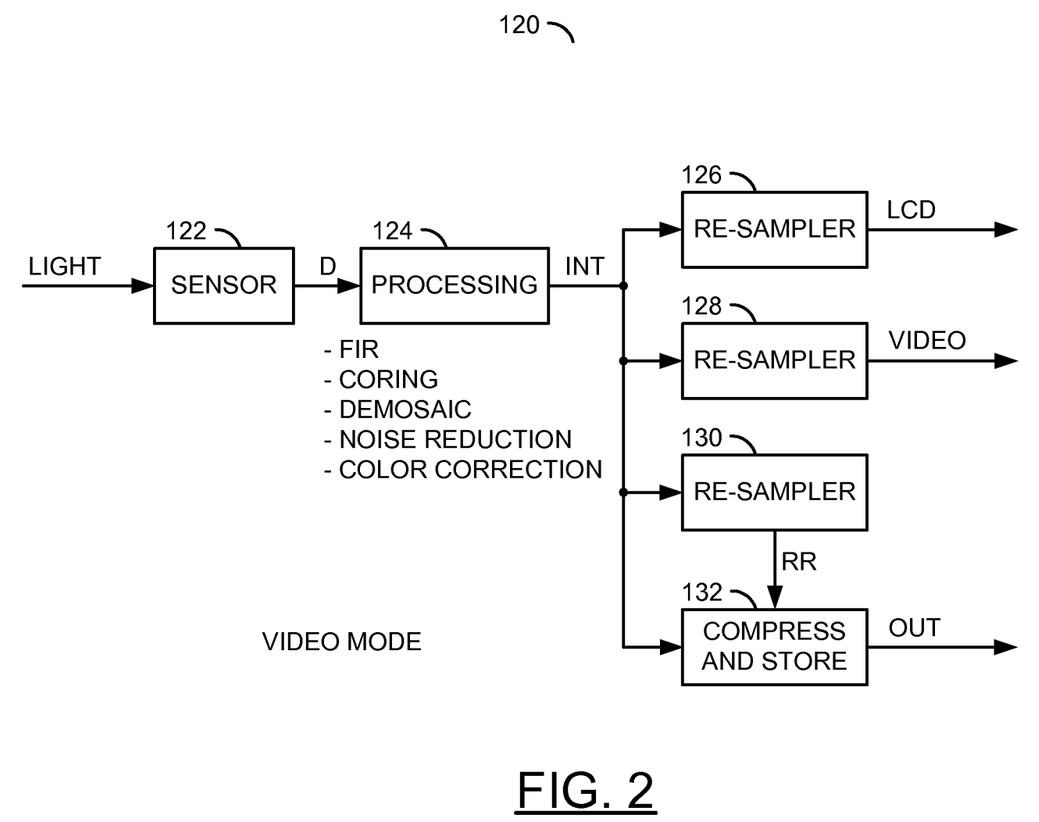
FIG. 2 is a functional block diagram of an example video mode processing method.

Referring to FIG. 2, a functional block diagram of an example video mode processing method 120 is shown. The method (or process) 120 may be generally implemented by the apparatus 100, and in particular, by the circuit 102 and the circuit 104. The method 120 may be active during a video mode of the apparatus 100. The method 120 generally comprises a step (or block) 122, a step (or block) 124, a step (or block) 126, a step (or block) 128, a step (or block) 130 and a step (or block) 132. Step 124 may be implemented using one or more of the circuits 111a-111n. Each step 126-130 may be implemented using a corresponding one of the circuits 111a-111n configured as a re-sampler circuit.

In some embodiments, the apparatus 100 may have three re-sampler circuits (e.g., circuits 111d-111f) that are configured for video processing. For example, a re-sampler circuit may be configured to generate the signal LCD. Another re-sampler circuit may be configured to generate the signal VIDEO. Still another re-sampler circuit may be configured to generate a reduced-resolution version of the video. In another embodiment, the apparatus 100 may have two re-sampler circuits that are used for two of the several video tasks (e.g., preview generation, external monitor signal generation, reduced resolution video, noise reduction, and the like).

In the step 122, the circuit 102 may convert the signal LIGHT into the signal D. One or more circuits (e.g., 111a-111c) within the circuit 104 may begin processing the input images (e.g., fields, frames, pictures) of the signal D in the step 124. The processing may include, but is not limited to filtering (e.g., a filing impulse response filtering), coring, demosaicing, noise reduction, color correction, color conversion and the like. The processed images may be presented in an internal signal (e.g., INT).

In the step 126, a circuit (e.g., 111d) may generate the signal LCD by at least down converting the images in the signal INT to a size generally matching the resolution of the circuit 109. Another circuit (e.g., 111e) may generate the signal VIDEO from the signal INT. Processing in the step 128 may be performed in parallel (approximately simultaneously) to the processing the step 126. In the step 130, another circuit (e.g., 111f) may generate a reduced resolution signal (e.g., RR) by down sampling the images in the signal INT. Processing in the step 130 may be performed in parallel (approximately simultaneously) to the processing in the steps 126 and 128.

In the step 132, a circuit (e.g., 111n) may compress the images received in the signal INT and/or the signal RR to create the signal OUT. The signal OUT may convey the compressed images to the circuit 108 for storage. In some embodiments, the step 132 may be timeshared between the signal INT and the signal RR. In other embodiments, a circuit (e.g., 111n) may be configured to compress the signal INT and another circuit (e.g., 111m) may be configured to compress the signal RR.

Figure 3:
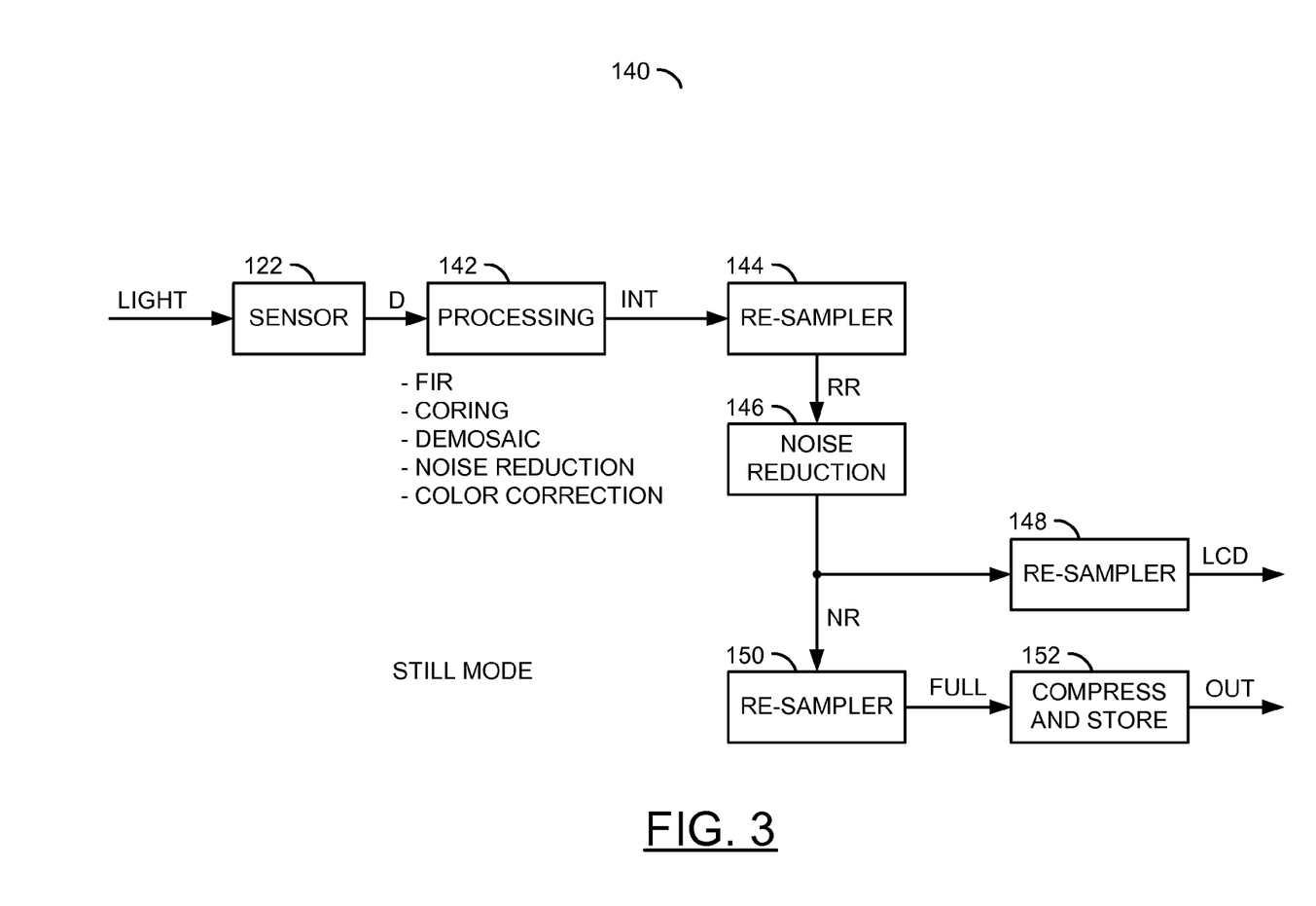
FIG. 3 is a functional block diagram of an example still mode processing method.

Referring to FIG. 3, a functional block diagram of an example still mode processing method 140 is shown. The method (or process) 140 may be generally implemented by the apparatus 100, and in particular, by the circuit 102 and the circuit 104. The method 140 may be active during a still mode of the apparatus 100. The method 140 generally comprises the step 122, a step (or block) 142, a step (or block) 144, a step (or block) 146, a step (or block) 148, a step (or block) 150 and a step (or block) 152. Step 142 may be implemented using one or more of the circuits 111a-111n. Each step 144-150 may be implemented using a corresponding one of the circuits 111a-111n configured as a re-sampler circuit.

While processing a still image, the apparatus 100 may use three re-sampler circuits (e.g., circuits 111d-111f) in any of several configurations. In an example configuration, a re-sampler circuit may generate a preview picture and two of the re-sampler circuits may be configured for noise reduction. In another example configuration, a re-sampler circuit may generate a preview picture, another re-sampler circuit may generate a thumbnail picture and yet another re-sampler circuit may be configured for noise reduction. In yet another configuration, a re-sampler circuit may be used for noise reduction and the other re-sampler circuits may remain unused. In another embodiment, two re-sampler circuits may be used in the still processing, a re-sampler circuit to generate the preview picture and the other re-sampler circuit may be used for noise reduction. Other numbers and configurations of re-sampler circuits may be implemented to meet the criteria of a particular application.

In the step 122, the circuit 102 may convert the signal LIGHT into the signal D. One or more circuits (e.g., 111a-111c) within the circuit 104 may begin processing the input images (e.g., fields, frames, pictures) of the signal D in the step 142. The processing may include, but is not limited to filtering (e.g., a filing impulse response filtering), coring, demosaicing, noise reduction, color correction, color conversion and the like. The processed images may be presented in the signal INT.

In the step 144, a circuit (e.g., 111d) may generate the signal RR by down converting an image in the signal INT to a lower resolution. A noise reduction of the images in the signal RR may be performed in the step 146. The step 146 may be implemented by configuring a circuit (e.g., 111e) with software and/or firmware or designing a dedicated hardware circuit, with or without firmware. The noise reduced images generated in the step 146 may be presented in a signal (e.g., NR). In the step 148, a circuit (e.g., 111f) may generate the signal LCD by at least converting the images in the signal NR to a size that generally matches the resolution of the circuit 109.

A circuit (e.g., 111g) may increase the image resolution in the step 150 by up conversion of the images in the signal NR. The resulting images may be presented in a signal (e.g., FULL). In some embodiments, the images of the signal FULL may have a same resolution as the images of the signal INT. In other embodiments, the images of the signal FULL may have a different (e.g., larger or smaller) resolution than the images of the signal INT. In the step 152, a circuit (e.g., 111n) may compress the images received in the signal FULL to create the signal OUT.

In some embodiments, re-sampling and noise reduction (e.g., steps 144 to 150) may be performed on the luminance components and the chrominance components of the images. In other embodiments, the re-sampling and the noise reduction may be performed only on the chrominance components. In still other embodiments, the re-sampling and the noise reduction may be performed only on the luminance components.

The circuits 111a-11n may be configured as several different types of polyphase re-sampler circuits for noise reduction purposes. For example, a re-sampler circuit may be configured in a degenerate manner where the re-sampler ratio is 1:1 (e.g., the output picture is the same size as the input picture). Furthermore, coefficients (taps) of the re-sampler circuit may be programmed to smooth the picture. In another example, a given re-sampler circuit may be configured for up sampling and another re-sampler circuit may be configured for down sampling. An effect is that the final picture is generally the same size as the input picture, but having been up sampled and down sampled, the final picture may be smoothed (e.g., see FIG. 3, steps 144 and 150). Another example configuration may also use re-sampler circuits for down sampling and subsequent up sampling with an additional noise reduction performed between (e.g., FIG. 3, step 146). The noise reduction step is generally beneficial in situations where the additional noise reduction has a limited number of input pixels that are used for computing each noise reduced output pixel. When the above scheme is used, the input pixels to noise reduction generally cover a larger area of the picture. The re-sampler circuits of the above examples may result in linear smoothing of the images.

Figure 4:
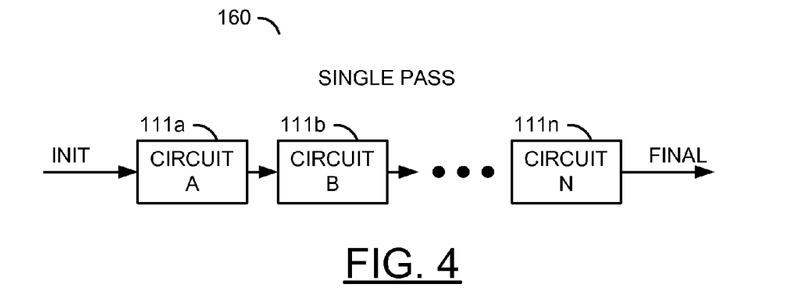
FIG. 4 is a block diagram of an example single pass configuration.

Referring to FIG. 4, a block diagram of an example single pass configuration 160 is shown. In the configuration 160, some or all of the circuits 111a-111n may be used in processing video and/or still pictures. The circuits 111a-111n involved with the processing may be linked to each other in a sequential fashion. For example, an initial circuit (e.g., 111a) may receive images in an initial signal (e.g., INIT). A last circuit (e.g., 111n) may generate and present processed images in a final signal (e.g., FINAL). In some embodiments, the circuits 111a-111n may be divided among multiple configurations 160 with or without a common segment. For example, a few of the circuits (e.g., 111a-111c) may be configured to perform initial processing of the images received from the circuit 102 in the signal D. The initial processing may be common to both video processing and still picture processing. Some circuits (e.g., 111d-111f) may be configured for single pass still processing. Other circuits (e.g., 111g-111n) may be configured for video processing. The signal INIT may be the signal D, the signal INT or some other received signal. The signal FINAL may be the signal LCD, the signal VIDEO, the signal OUT or some other generated signal.

Figure 5:
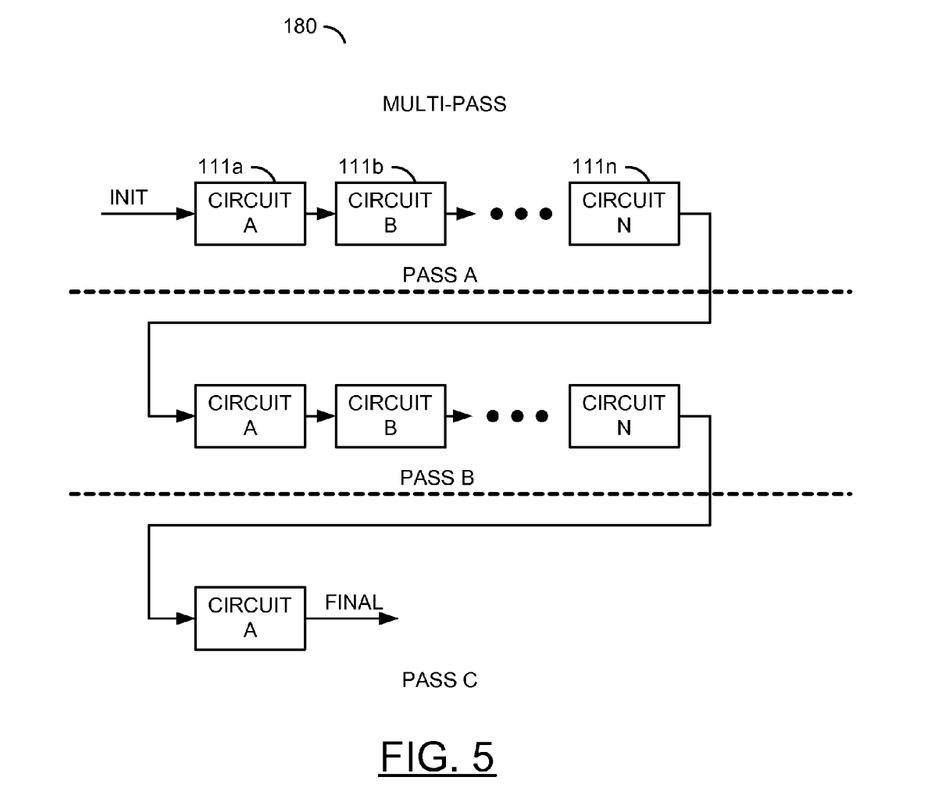
FIG. 5 is a block diagram of an example multi-pass configuration.

Referring to FIG. 5, a block diagram of an example multi-pass configuration 180 is shown. In the configuration 180, some or all of the circuits 111a-111n may be used in processing video and/or still pictures. The circuits 111a-111n involved with the processing may be linked to each other in a substantially sequential fashion on a per-pass basis and looped back such that at least one of the circuits 111a-111n is used in more than a single pass. For example, the circuits 111a-111n may be arranged sequentially for an initial pass A.

The signal INIT may be received by an initial circuit (e.g., 111a) in the pass A. The images generated by a final circuit (e.g., 111n) may be routed back to the initial circuit to start a next pass B. Pass B may utilize the same circuits 111a-111n as the pass A. At the end of pass B, the images may be routed back again to the initial circuit for a pass C. The looping back of the images to the initial circuit may be repeated one or more times until the images have been transformed into a final form. The last circuit (e.g., 111a) in the last pass (e.g., pass C) may present the processed images (e.g., video or still pictures) in the signal FINAL. Some passes (e.g., pass C) may use fewer of the circuits 111a-111n that the other passes (e.g., pass A).

Because each pass A to pass C may be substantially sequential, the multi-pass process 180 generally takes an amount of time that is approximately a sum of the time used for an individual pass. Therefore, single pass processing may be faster than multi-pass processing. The multi-pass processing may yield a high quality final picture by doing one or more of the following:

1. Using the same noise reduction circuit in a substantially similar manner more than once. If the noise reduction circuit has a maximum amount of noise reduction strength, using the circuit more than once may increase the effective maximum strength.

2. Using the same noise reduction circuit in a single pass for luminance and in another pass for chrominance. As such, a camera that has a noise reduction circuit that is capable of processing luminance data or chrominance data may be used to perform the noise reduction on both the luminance channel and the chrominance channels.

3. Using a single circuit that may be configured either for noise reduction or sharpening generally reduces the area of the circuitry in comparison to having separate noise reduction and sharpening circuits. A multi-pass circuit may perform noise reduction in a given pass and sharpening in another pass. Such a circuit may include a Finite Impulse Response (FIR) circuit, as FIR circuits may be used for both sharpening and noise reduction.

4. The same circuits may be used to process a picture in a given pass with little or no noise reduction and in a next pass with more noise reduction. The pictures may then be combined at the end of the current pass or in a subsequent pass. By way of example, pass A may be used to perform the strong noise reduction on the images received in the signal INIT. Pass B may be used to perform the weak or no noise reduction on the same images. Pass C may combine the results of the strong noise reduced images with the weak noise reduced images to create final images. Additional information regarding strong and weak noise reduction may be found in co-pending U.S. application Ser. No. 12/731,372 filed Mar. 25, 2010, hereby incorporated by reference in its entirety.

Besides being configurable to process in a single pass or multiple passes, the apparatus 100 may be programmable to process in a different number of passes for multi-pass. In some embodiments, the circuits 111a-111n may be configurable to operate by receiving picture data directly from the circuit 102 or from the circuit 106.

Figure 6:
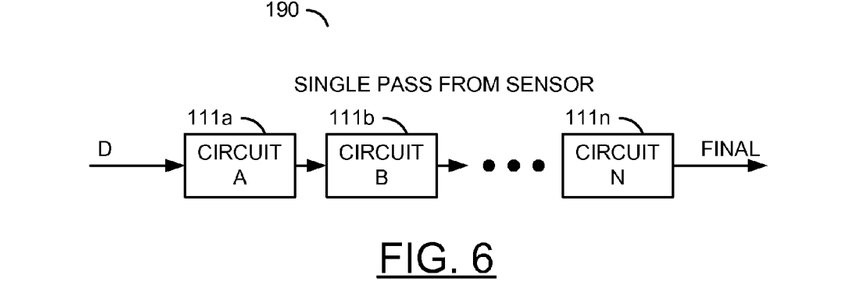
FIG. 6 is a block diagram of an example single pass process starting with image data from a sensor.

Referring to FIG. 6, a block diagram of an example single pass process 190 starting with image data from a sensor is shown. In the process 190, the image data generally comes directly from the circuit 102 via the signal D. The processed images may be presented in the signal FINAL. Depending upon the configuration of the apparatus 100, the signal FINAL may include the signal LCD, the signal VIDEO and/or the signal OUT.

Figure 7:
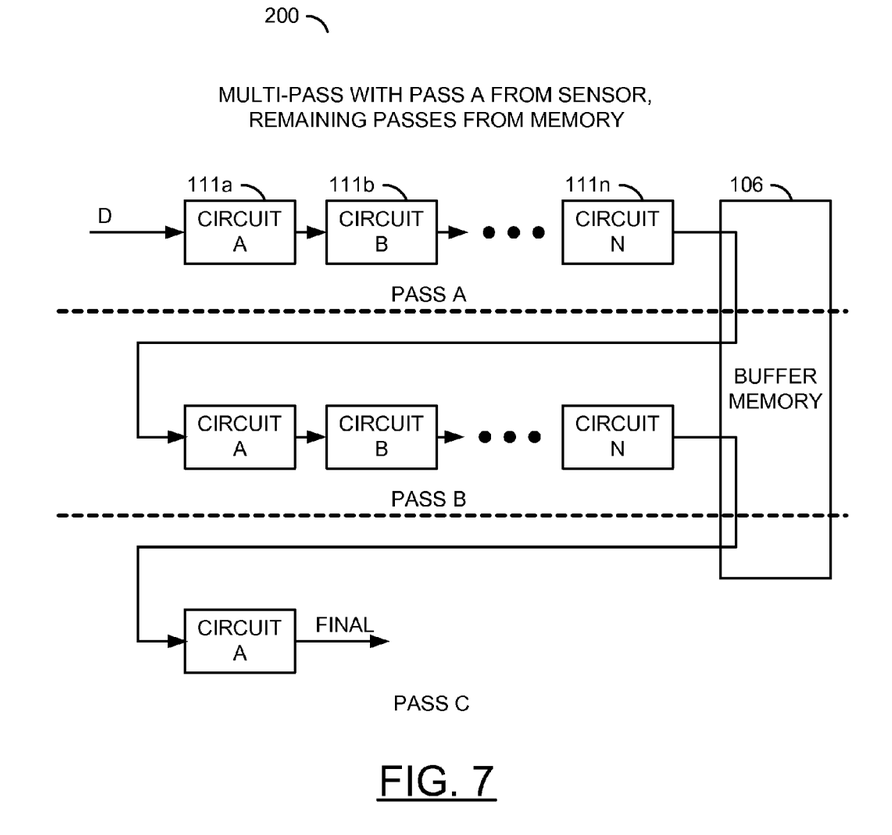
FIG. 7 is a block diagram of an example multi-pass process starting with the image data from the sensor.

Referring to FIG. 7, a block diagram of an example multi-pass process 200 starting with image data from a sensor is shown. In the process 200, the image data may initially be received by the circuit 104 (e.g., circuit 111a) from the circuit 102 in the signal D. Between passes, the images may be buffered in the circuit 106. The processed images may be presented in the signal FINAL. Depending upon the configuration of the apparatus 100, the signal FINAL may include the signal LCD, the signal VIDEO and/or the signal OUT.

Figure 8:
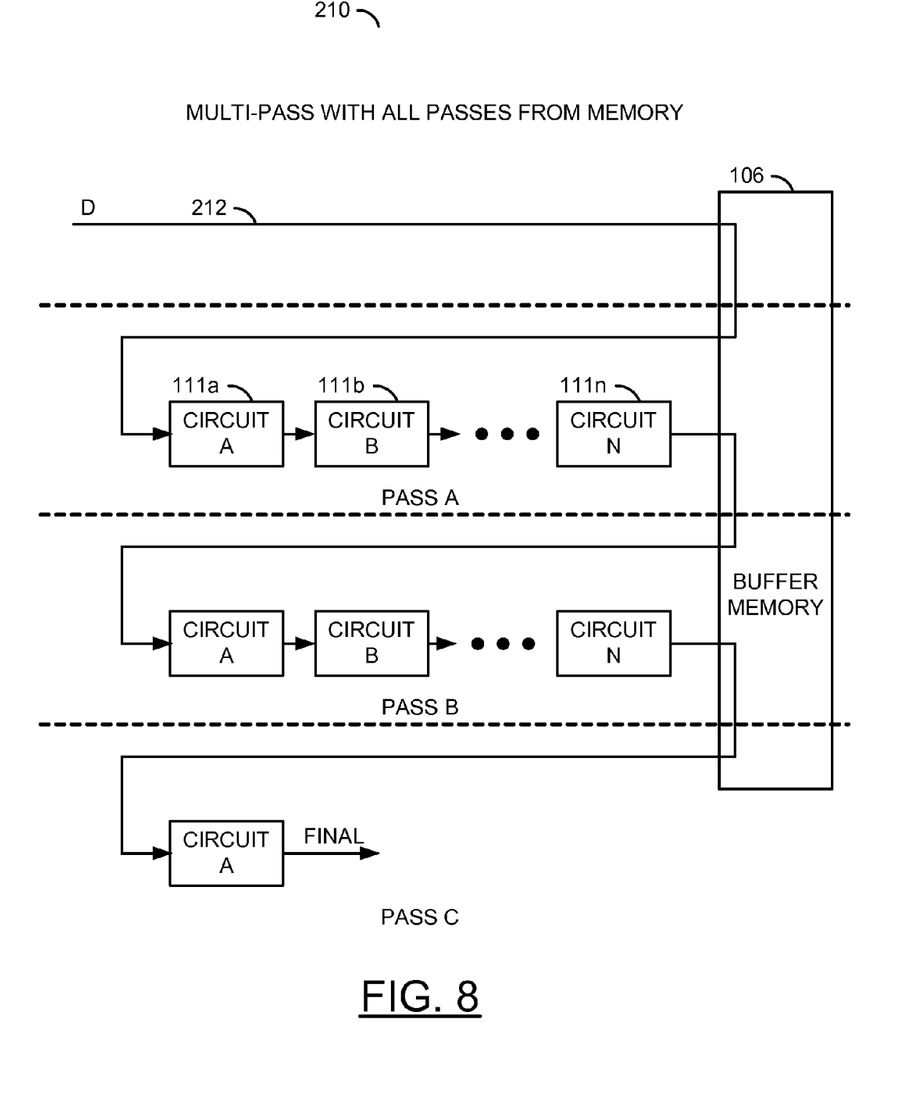
FIG. 8 is a block diagram of an example multi-pass process with all passes starting from a DRAM.

Referring to FIG. 8, a block diagram of an example multi-pass process 210 with all passes starting from a DRAM is shown. In the process 210, the image data may be passed from the circuit 102 in the signal D, through the circuit 104 without processing to the circuit 106, see path 212. Afterwards, pass A may begin using the image data as read from the circuit 106. Pass A may conclude by writing the partially-processed images back into the circuit 106. Pass B may begin using the partially processed images read from the circuit 106. Each pass may begin with reading images from the circuit 106 and end with storing the resulting images back into the circuit 106. The final pass (e.g., pass C) may present the final images in the signal FINAL. Depending upon the configuration of the apparatus 100, the signal FINAL may include the signal LCD, the signal VIDEO and/or the signal OUT.

The following criteria may be considered to determine when the apparatus 100 should use single pass processing and/or when multi-pass processing should be used, as well as criteria for determining how many passes to use:

1. Single pass processing may be used for video, where each image (e.g., field or frame) may be processed in a limited amount of time. Multi-pass processing may be used for still images (e.g., pictures).

2. Single pass processing is generally used for low-ISO (less noise) still images. Multi-pass processing may be used for high-ISO (more noisy) still images.

3. Multi-pass processing is generally used for still images, where the number of passes depends on the ISO level.

4. Single pass processing may be used for burst mode (a few individual images taken in a rapid sequence) still processing or a continuous mode still processing. Multi-pass processing is generally used for a single image mode processing.

5. A particular number of passes may be used for multi-pass processing in the burst mode still processing or the continuous mode still processing. A larger number of passes than the particular number are generally used for multi-pass processing in the single image mode.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to (i) receive an input signal from an electro-optical sensor, said input signal comprising at least one input image, and (ii) generate a compressed signal based on said input signal, said first circuit comprising,
a plurality of re-sampler circuits, (i) said re-sampler circuits comprising dedicated hardware circuits that are allocated differently by said first circuit based upon an image type to be processed, (ii) each of said re-sampler circuits is configured to process a corresponding plurality of first samples to generate a corresponding plurality of second samples, and (iii) each of said second samples is a linear combination of at least two of said first samples, wherein when processing said input image as a video type image, (i) said processing includes all tasks among (a) generating a first signal by converting said input signal into a first form suitable to display on an external video monitor, (b) generating a second signal by converting said input signal into a second form suitable to display on a preview screen and (c) generating a third signal by reducing a resolution of said input signal prior to compression, (ii) at least three of said re-sampler circuits perform different ones of said tasks, and (iii) said compressed signal comprises video images, and when processing said input image as a still type image, (i) said processing includes (a) generating said third signal, (b) performing a noise reduction of said third signal, and (c) generating said second signal based on said third signal after said noise reduction, (ii) said processing of said still type image uses at least two of said re-sampler circuits involved in said processing of said video type image and (iii) said compressed signal comprises a still image.

2. The apparatus according to claim 1, wherein each of said re-sampler circuits is used at most once to perform said still processing.

3. The apparatus according to claim 1, wherein said noise reduction comprises a linear smoothing of said input image in said third signal.

4. The apparatus according to claim 1, wherein (i) a first of said re-sampler circuits is configured to generate said third signal comprising a down-sampled version of said input image by down sampling said input image and (ii) a second of said re-sampler circuits is configured to reduce a noise of said down-sampled version of said input image after said down sampling.

5. The apparatus according to claim 4, wherein a third of said re-sampler circuits is configured to generate a second internal signal by up sampling said down-sampled version of said input image after said reduction of said noise.

6. The apparatus according to claim 1, wherein processing said input image as said still type image further includes using at least one of said re-sampler circuits to generate a preview picture, displayable on said preview screen, by down sampling said input image.

7. The apparatus according to claim 1, wherein (i) said at least one re-sampler circuit involved in processing said input image as said still type image is configured to generate an output image from said input image, (ii) said output image and said input image are equal in size and (iii) said output image is smoother than said input image.

8. An apparatus comprising:
a first circuit configured to (i) receive an input signal from an electro-optical sensor, said input signal comprising at least one input image, and (ii) generate a compressed signal based on said input signal, said first circuit comprising,
a plurality of re-sampler circuits, (i) said re-sampler circuits comprising dedicated hardware circuits that are allocated differently by said first circuit based upon an image type to be processed, (ii) each of said re-sampler circuits is configured to process a corresponding plurality of first samples to generate a corresponding plurality of second samples and (iii) each of said second samples is a linear combination of at least two of said first samples, wherein
said processing of said input signal as a video type image and as a still type image involves at least two passes of said input image through at least three of said re-sampler circuits in a multi-pass mode.

9. The apparatus according to claim 8, wherein at least one of said re-sampler circuits is configured as a finite impulse response filter circuit.

10. The apparatus according to claim 8, wherein at least one of said re-sampler circuits is configured as a coring circuit.

11. The apparatus according to claim 8, wherein at least one of said re-sampler circuits is configured as a demosaicing circuit.

12. The apparatus according to claim 8, wherein at least one of said re-sampler circuits is configured as a noise reduction circuit.

13. The apparatus according to claim 8, wherein at least one of said re-sampler circuits is configured as a color correction circuit.

14. The apparatus according to claim 8, wherein (i) a first of said passes is used to process said input image of said input signal with more noise reduction than a second of said passes and (ii) a first result of said first pass and a second result of said second pass are combined.

15. The apparatus according to claim 8, wherein said first circuit uses (i) one of said passes to process video and (ii) at least two of said passes to process a still image.

16. The apparatus according to claim 8, wherein a number of said passes through said re-sampler circuits is based on an ISO level of said input image of said input signal.

17. The apparatus according to claim 8, wherein a number of said passes through said re-sampler circuits is greater while said first circuit is not in a burst mode than while said first circuit is in said burst mode.

18. The apparatus according to claim 8, wherein (i) said re-sampler circuits comprise at least two dedicated hardware circuits, (ii) all of said dedicated hardware circuits are used in a first of said passes and (iii) all of said dedicated hardware circuits are used in a second of said passes.

19. The apparatus according to claim 8, wherein (i) said re-sampler circuits comprise at least two dedicated hardware circuits, (ii) all of said dedicated hardware circuits are used in a first of said passes, (iii) a first of said dedicated hardware circuits is used in a second of said passes and (iv) a second of said dedicated hardware circuits is not used in said second pass.

20. The apparatus according to claim 8, wherein a first of said passes is performed substantially in sequence with a second of said passes.

21. The apparatus according to claim 8, wherein (i) at least one of said re-sampler circuits is configured as a noise reduction circuit in a first of said passes, (ii) said noise reduction circuit is configured to generate a noise reduced picture and (iii) said noise reduced picture is used as input to said noise reduction circuit in a second of said passes.

22. The apparatus according to claim 8, wherein said processing involves a single of said passes through at least one of said re-sampler circuits in a single pass mode.

23. The apparatus according to claim 22, wherein said at least one re-sampler circuit is configured to operate in said single pass mode to process video.

24. The apparatus according to claim 8, wherein at least one of said re-sampler circuits is configured to (i) process a plurality of pixels without storing said pixels to an external memory when processing video images and (ii) process said plurality of pixels after having stored said pixels to said external memory when processing a still image.

25. The apparatus according to claim 8, wherein at least one of said re-sampler circuits is configured to (i) process a plurality of pixels without storing said pixels to an external memory when processing a still image in a single pass and (ii) process said plurality of pixels after having stored said pixels to said external memory when processing said still image in at least two passes.

26. The apparatus according to claim 8, wherein (i) said re-sampler circuits are configured to convert a size of said input image in said input signal and reduce a noise of said input image and (ii) both said conversion of said size and said reduction of said noise are performed only on a plurality of chrominance components of said input image.

\* \* \* \* \*